(12) United States Patent
Dinh et al.

(10) Patent No.: US 7,667,136 B2
(45) Date of Patent: Feb. 23, 2010

(54) SELF CUTTING ELECTRICAL OUTLET BOX

(75) Inventors: Cong Thanh Dinh, Collierville, TN (US); Charles E. Whipple, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 98 days.

(21) Appl. No.: 12/001,324

(22) Filed: Dec. 11, 2007

(65) Prior Publication Data

US 2008/0149360 A1 Jun. 26, 2008

Related U.S. Application Data

(60) Provisional application No. 60/876,057, filed on Dec. 20, 2006.

(51) Int. Cl.
*H01H 9/02* (2006.01)

(52) U.S. Cl. .............................. 174/58; 174/50; 174/60; 174/64; 174/59; 174/61; 439/535; 248/906

(58) Field of Classification Search .................... 174/50, 174/60, 58, 135, 64, 59, 61; 220/3.2, 3.3, 220/4.02; 439/535, 536; 248/906; 52/16
See application file for complete search history.

(56) References Cited

U.S. PATENT DOCUMENTS

| 3,160,458 | A | * | 12/1964 | Laudel, Jr. et al. | .......... 439/536 |
| 4,176,758 | A |   | 12/1979 | Glick | |
| 4,730,395 | A |   | 3/1988 | Blessing, Sr. | |
| 4,969,269 | A |   | 11/1990 | Dominguez | |
| 5,797,189 | A |   | 8/1998 | Gilbert | |
| 5,867,913 | A |   | 2/1999 | Pettigrew | |
| 6,125,593 | A | * | 10/2000 | Randolph et al. | .............. 52/16 |
| 7,214,876 | B1 | * | 5/2007 | Haberek et al. | ............... 174/58 |

* cited by examiner

*Primary Examiner*—Dhiru R Patel
(74) *Attorney, Agent, or Firm*—Hoffmann & Baron, LLP (57) ABSTRACT

The present invention is directed to a self-cutting electrical outlet box. The electrical outlet box is self cutting, allowing the box to be installed through an existing building surface. The box includes teeth or cutting members to assist in self-cutting. The box also includes features to assist in placement and securement of the box to a wall.

8 Claims, 10 Drawing Sheets

SELF CUTTING ELECTRICAL OUTLET BOX

CROSS-REFERENCE TO RELATED APPLICATION

This application claims priority to U.S. Provisional Patent Application No. 60/876,057, filed on Dec. 20, 2006, herein incorporated by reference.

FIELD OF INVENTION

The present invention relates generally to an electrical outlet box. More particularly, the present invention relates to an electrical outlet box that is self cutting, allowing the box to be installed through an existing building surface.

BACKGROUND OF THE INVENTION

It has long been known to use electrical outlet boxes to mount switches and receptacles in structural building surfaces such as walls and ceilings. In order to access the wires run behind the walls and ceilings in existing structures, a hole is cut through the wall using a wide variety of tools such as drills, wallboard saws and the like. It is imperative that the hole be cut to the proper size to accommodate the outlet box, so that the box can be securely mounted in the opening placed in the wall and so that the hole can be covered by an appropriate plate or covering.

As may be appreciated, the installer is, therefore, required to carry a variety of cutting implements, as well as alignment and sizing devices so as to accurately cut desired openings in different types of structural walls.

Specialized tools used for cutting holes in structural surfaces such as wallboard and plywood are well known. Examples of such cutting devices may be seen in U.S. Pat. Nos. 4,730,395; 4,969,269; 5,727,189 and 5,867,913. However, to use these tools, it is required that in addition to carrying the appropriate supplies and type of electrical outlet box, a tool matching the desired box must also be carried by the installer.

It is, therefore, desirable to provide a simple and easy way to cut an appropriate size hole in wallboard, plywood and the like, for installation of an electrical outlet box.

SUMMARY OF THE INVENTION

The present invention provides a self cutting electrical outlet box assembly which cuts an opening in a structural surface such as wallboard and plywood and allows for the associated installation of the box upon cutting.

The present invention provides an electrical box having an open front face an opposed rear wall and perimetrical sidewall therebetween defining a box interior. A cutting member is formed at least partially along the perimetrical wall and extends externally of the rear wall.

In a preferred embodiment, the cutting member may be integrally formed with the electrical outlet box.

In a further embodiment, the cutting member may include an attachment portion for attachment to the rear wall of the electrical outlet box and a cutting edge extending from the attachment portion, at least partially, along the perimetrical wall.

In a still further preferred embodiment, the electrical outlet box may be a circular box so that the box may be rotated with respect to a wall surface to effect cutting of the wall surface thereby.

BRIEF DESCRIPTION OF PREFERRED EMBODIMENTS

Figure 1:
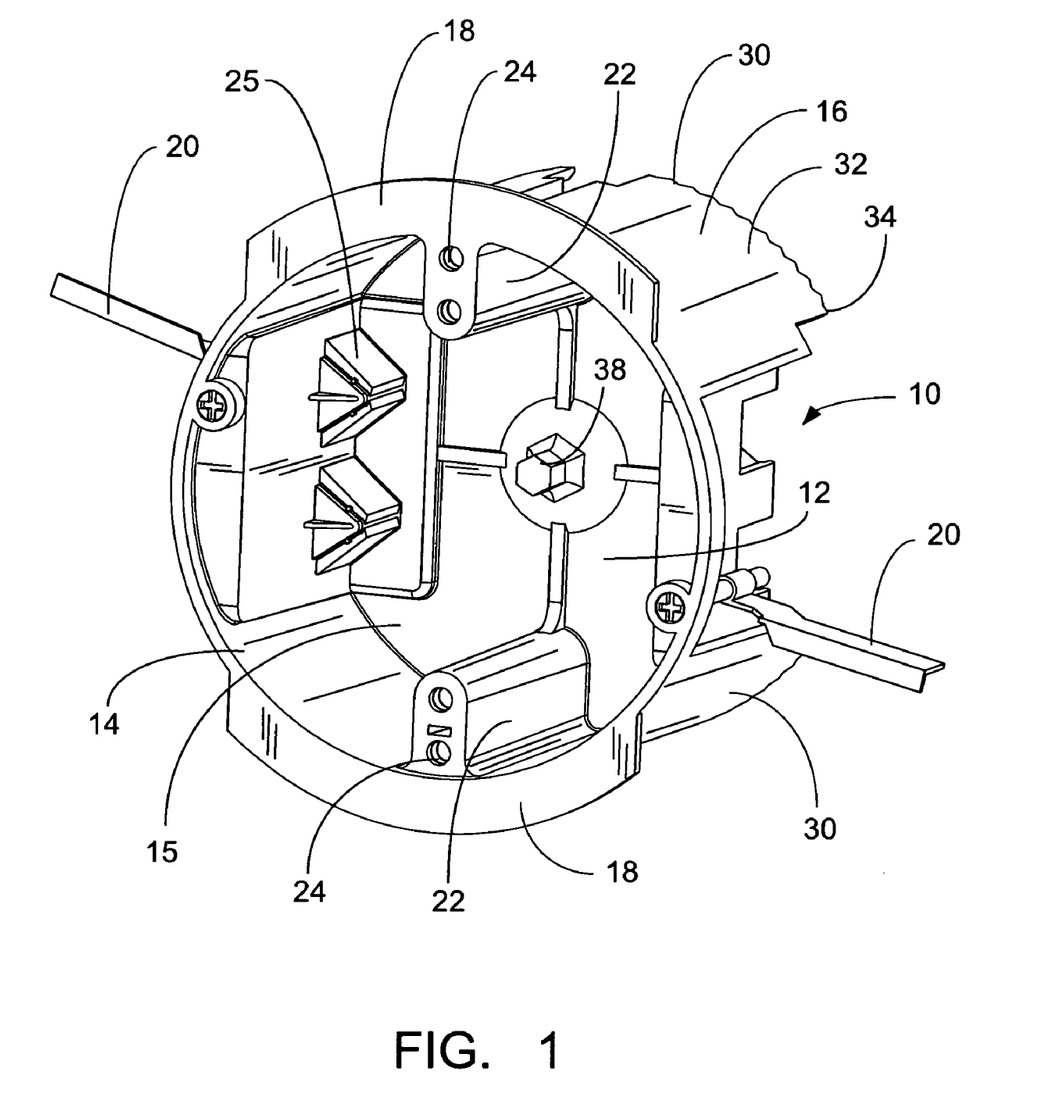
FIGS. 1 and 2 show respectively, front and rear perspective views of one embodiment of the self cutting outlet box of the present invention.
Figure 2:
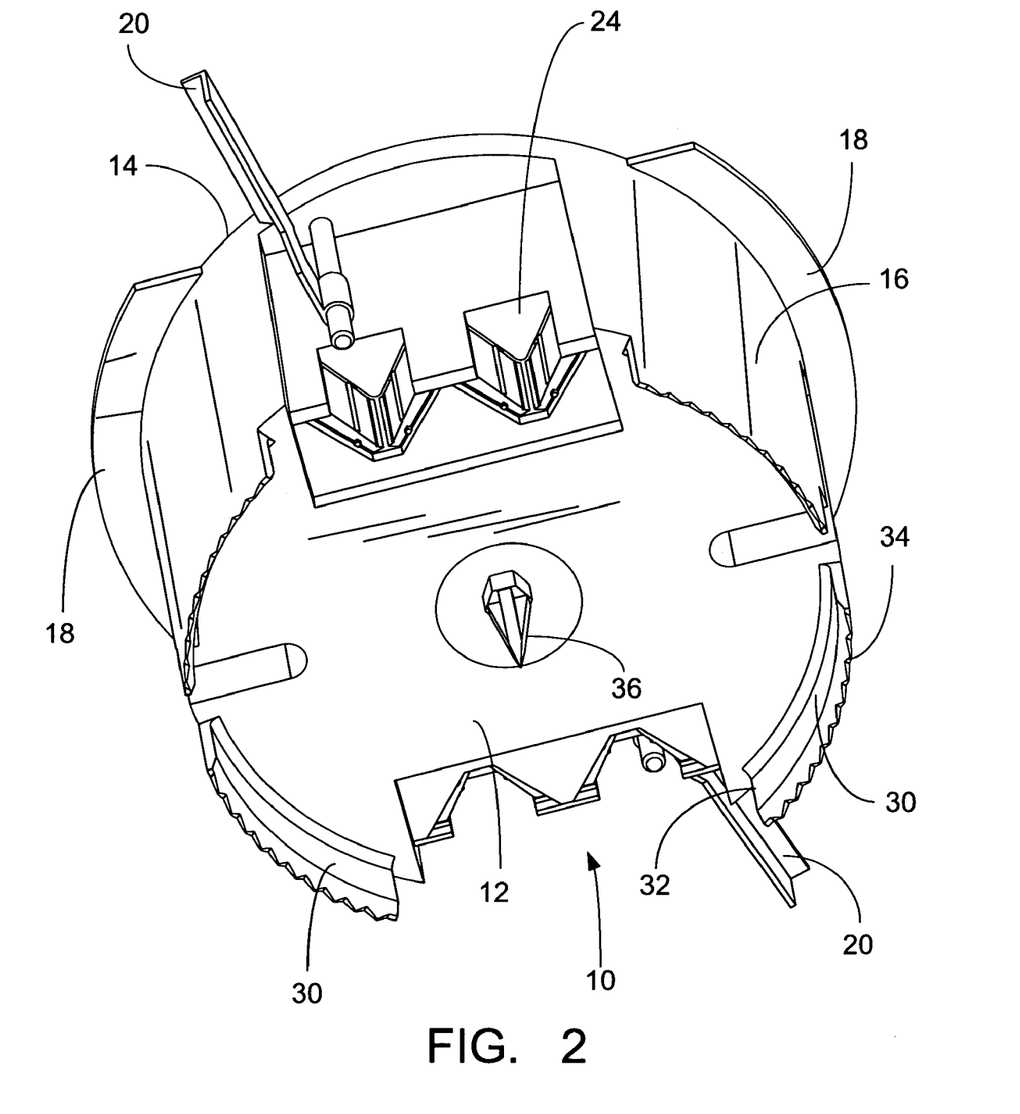

Referring now to FIGS. 1 and 2, the self-cutting electrical outlet box of the present invention is shown. Electrical outlet box 10 is of generally circular construction, having a flat-back wall 12 an opposed open-front face 14 and a generally cylindrical sidewall 16, extending perimetrically therebetween. The box 10 defines a box interior 15, which may support electrical devices such as switches and receptacles as is well known.

Box 10 may be formed of suitable plastic material well known in the art. While a plastic circular box is shown, the present invention is not limited thereto. Other materials and configurations may also be employed.

As is well known, box 10 is designed to be attached to a structural surface, such as wallboard, plywood or the like, through a hole placed therein. In that regard, the front face 14 of box 10 includes a pair of diametrically opposed outwardly extending flanges 18 which engage the outer surface of the wall through which the box is installed. The present invention also includes a pair of conventional wings 20, which are mounted for swing movement against the back surface of the wall. The wings are designed to fully engage the back surface of the wall so that box may be secured to the wall between the flanges 18 and the wings 20. The use of flanges and mounting wings to mount the electrical outlet box to the wall through a hole placed therein is a well known technique for installing "old work" boxes.

Box 10 further includes a pair of diametrically opposed mounting shoulders 22 positioned within interior 15 of the box 10. Shoulder 22 includes mounting apertures 24, which allow for securement of electrical devices such as switches and receptacles (not shown), as well as covers and face plates (also not shown). Box 10 also includes cable entry structure 24 which allows electrical cable to be passed into the interior 15 of box 10.

Boxes of the type commonly used within old work installation are typically attached to the wall through a pre-cut hole placed therein. The present invention provides a self-cutting box which places a hole in the wall upon installation. Box 10 in this embodiment includes a cutting member 30 formed adjacent back wall 12. Cutting member 30, in the embodiment shown in FIGS. 1 and 2, is provided by an integrally formed extension of sidewall 16. Extension 32 in this embodiment extends at least partially circumferentially around back wall 12. A distal edge 34 of extension 32 is serrated, providing a cutting edge capable of cutting through wallboard, plywood or the like. While cutting through the wall may be achieved manually, by forcibly projecting the box through the wall, the circular configuration of the box allows the cutting edge to be manipulated in a rotational manner to cut a circular opening through the wall. To facilitate such rotational movement, a center punch 36 extends outwardly from an extended surface of back wall 12 to provide a pilot hole about which rotation of the box may be achieved.

Further, on the internal surface of back wall 12, a tool attachment hub 38 is provided. As will be described in further detail hereinbelow, the tool attachment hub 38 allows attachment of a conventional power tool such as a drill, which will rotate the box to cut a hole through the wall.

Figure 3:
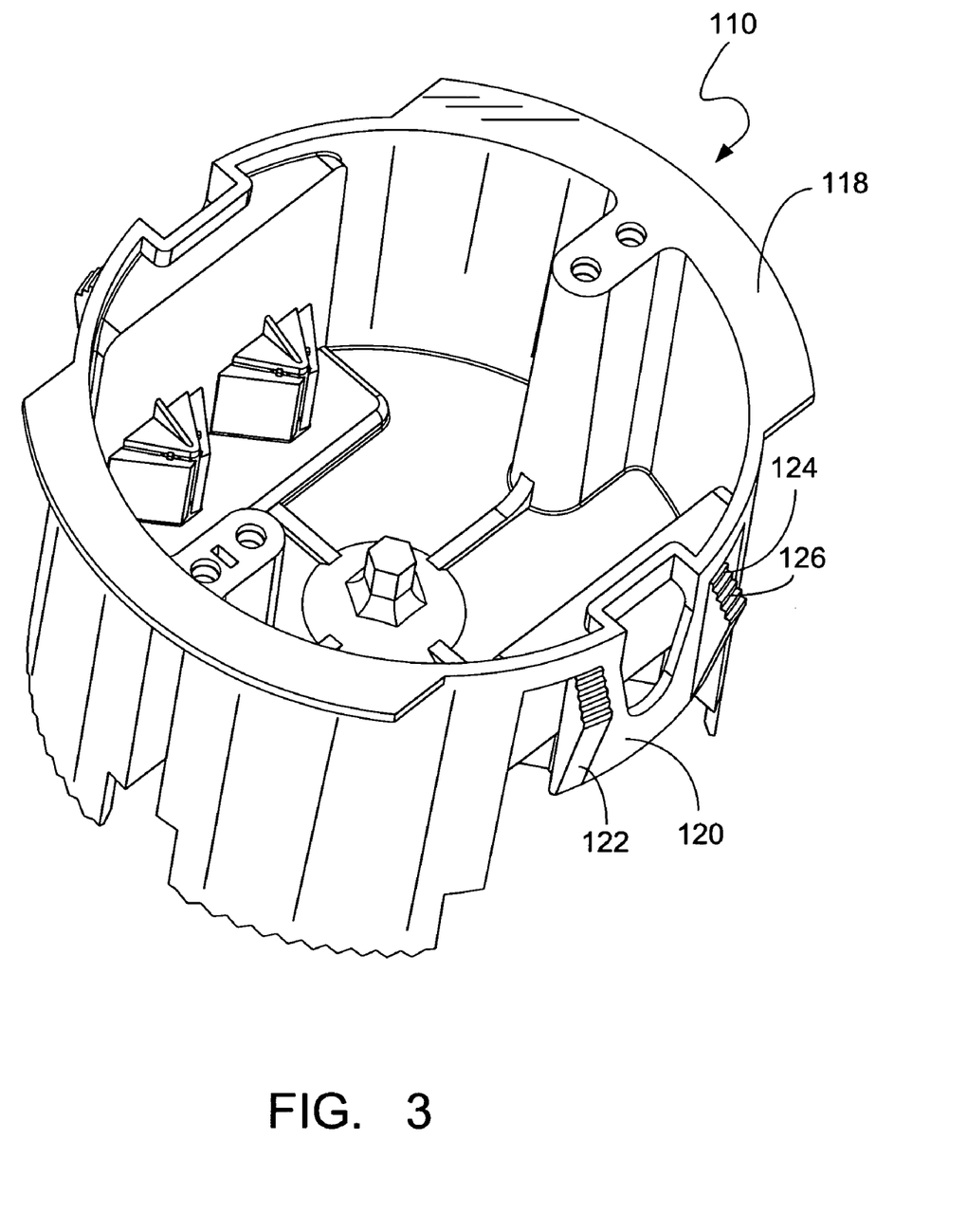
FIGS. 3 and 4 show respectively front and rear perspective views of a second embodiment of the self cutting outlet box of the present invention.
Figure 4:
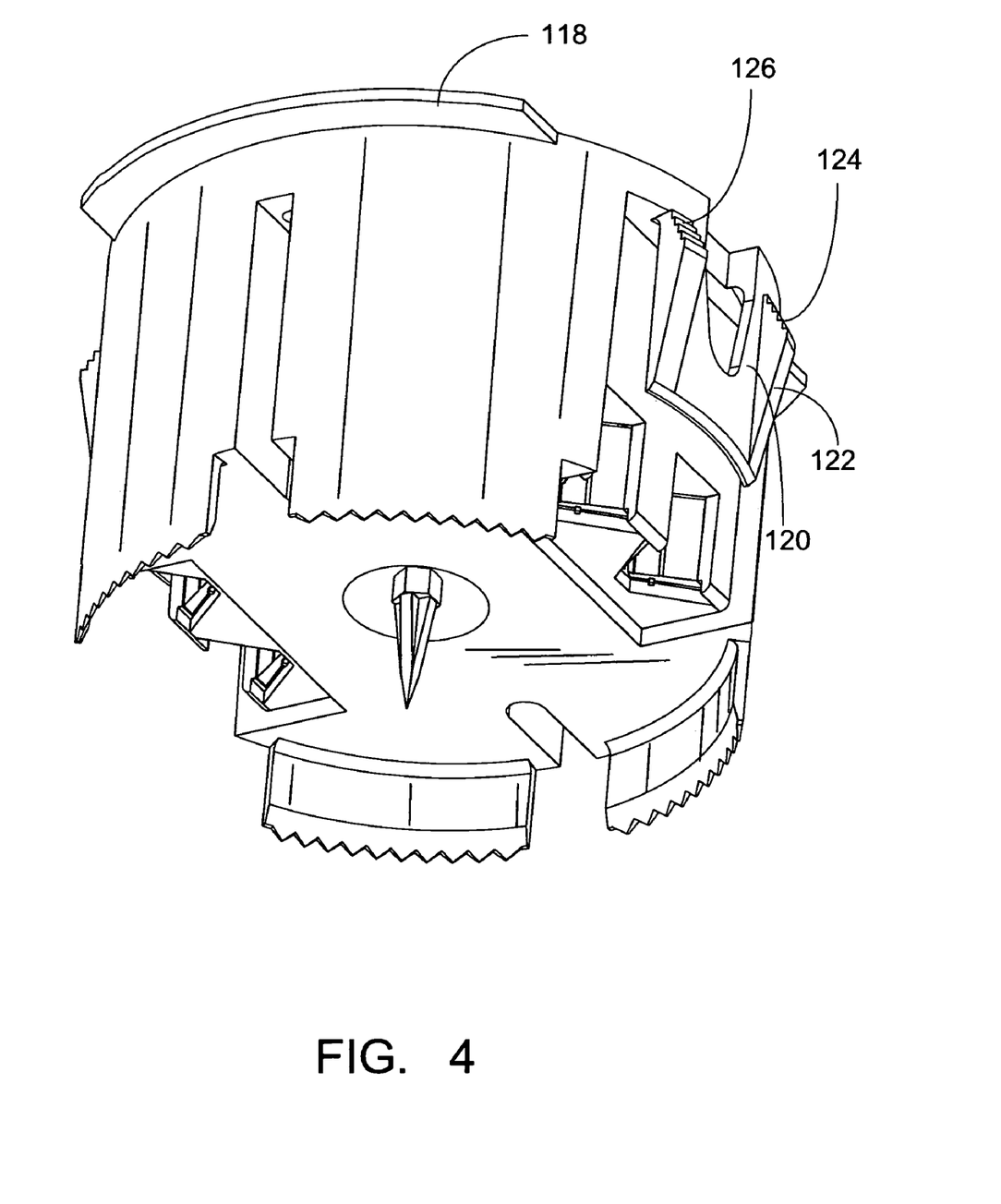

Referring now to FIGS. 3 and 4, a further embodiment of the self-cutting outlet box of the present invention is shown. Box 110 is substantially similar to box 10 shown in FIGS. 1 and 2. However, box 110 includes a pair of deflectable mounting ears 120, which may be deflectably inserted into the opening in the wall upon formation thereof. Deflectable mounting ears 120 include tapered lead-in portions 122 for facilitating insertion of the mounting ears into the opening formed in the wall. Mounting ears 120 also include a forwardly directed securement surface 124, having gripping teeth 126 thereon. Upon insertion of the box 110 into the opening in the wall, the mounting ears 120 are deflectable to permit insertion and the gripping teeth 126 engage the rear surface of the wall with the flanges 118, engaging the front surface of the wall. The box is secured between the mounting ears 120 and the flanges 118.

Figure 5:
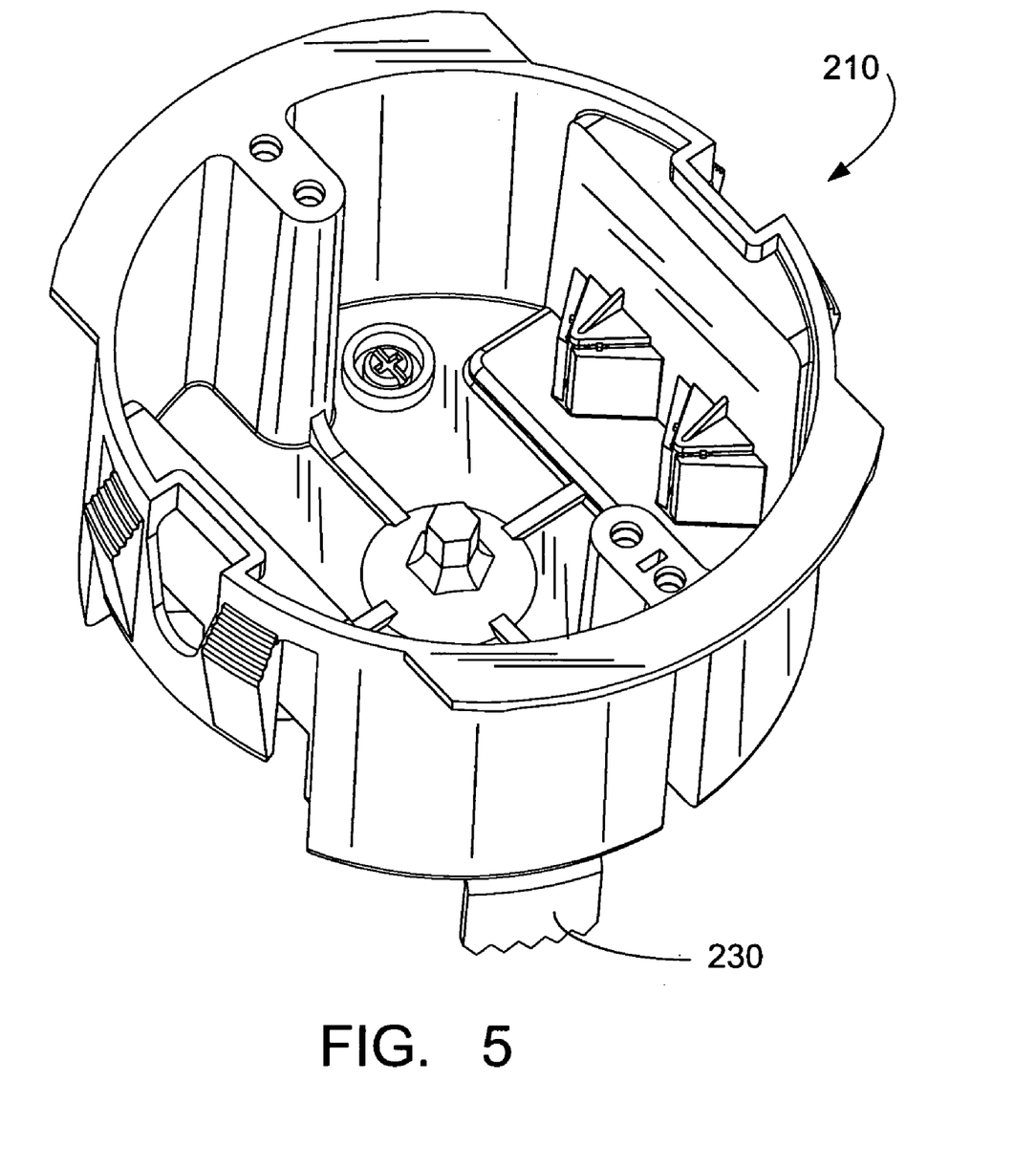
FIGS. 5 and 6 show respectively, front and rear perspective views of a third embodiment of the self cutting outlet box of the present invention.
Figure 6:
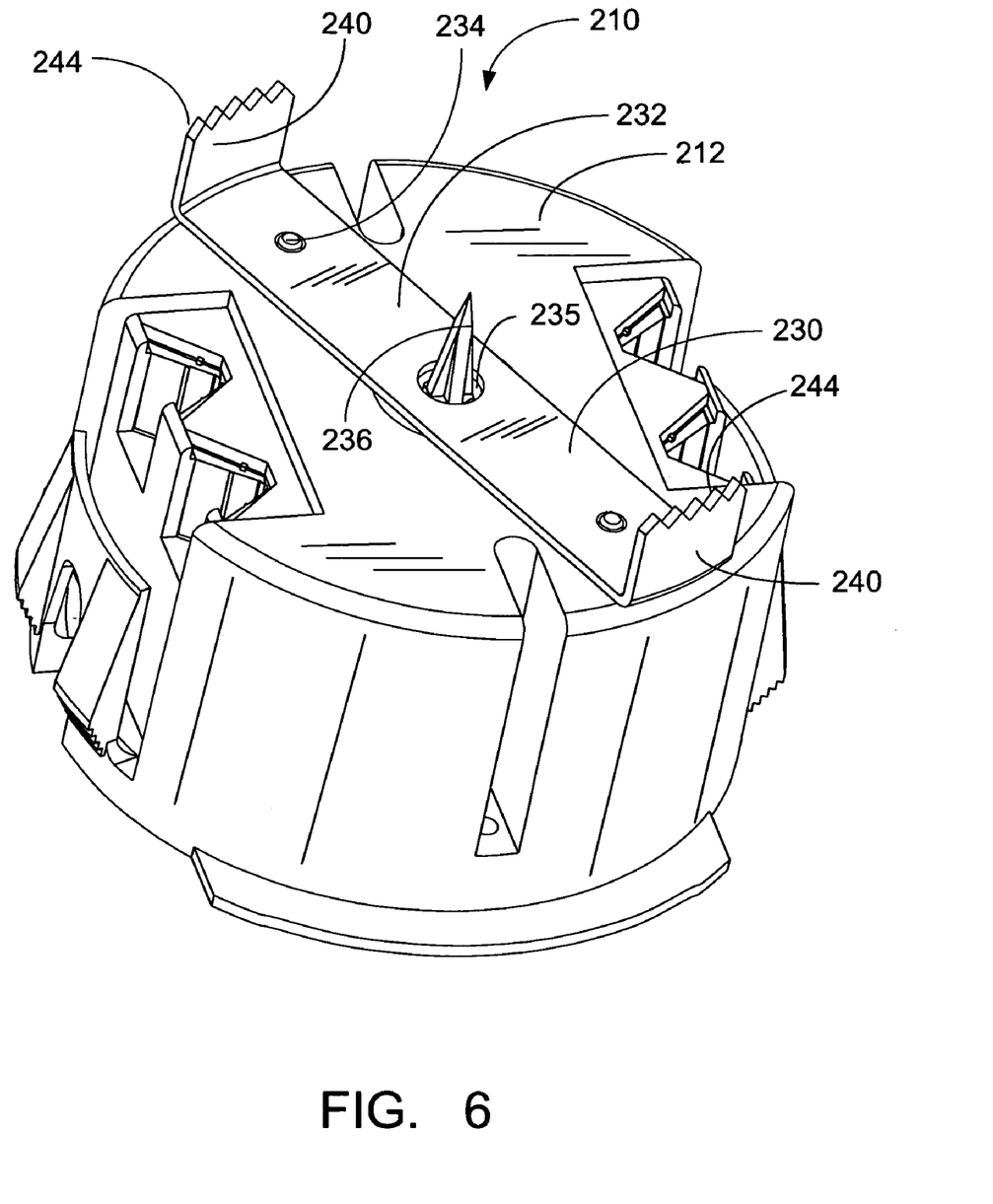

Referring now to FIGS. 5 and 6, the further embodiment of the present invention is shown. Box 210 is substantially similar to box 110 shown in FIGS. 3 and 4. However, rather than employing an integrally formed cutting member 30, the cutting member 230 of box 210 is separately formed and attached thereto. Cutting member 230 is an elongated member having a planar attachment portion 232, having a length, which approximates the diameter of the outlet box 210. Planar attachment portion 232 may be affixed to the rear surface of back wall 12 with appropriate attachment hardware 234. A central opening 236 exists in attachment member 232 to allow passage of punch 236 therethrough.

The opposed ends of attachment member 230 include upwardly extending cutting extents 240. Cutting extents 240 have distal cutting edges 244 which are serrated to permit cutting of wallboard, plywood or the like in a manner similar to that shown in the previous embodiments. As the cutting member 230 of the present embodiment is separately attached to box 10, the cutting member 230 may be formed of different material. It is contemplated that cutting member 230 of FIGS. 5 and 6 may be formed of metal thereby allowing the cutting member to cut through tougher structural surfaces. Another embodiment not shown would employ cutting teeth that are coated or embedded with another harder material, such as coating plastic with metal or embedded metal or other hard substances into or onto the underlying medium.

Figure 7:
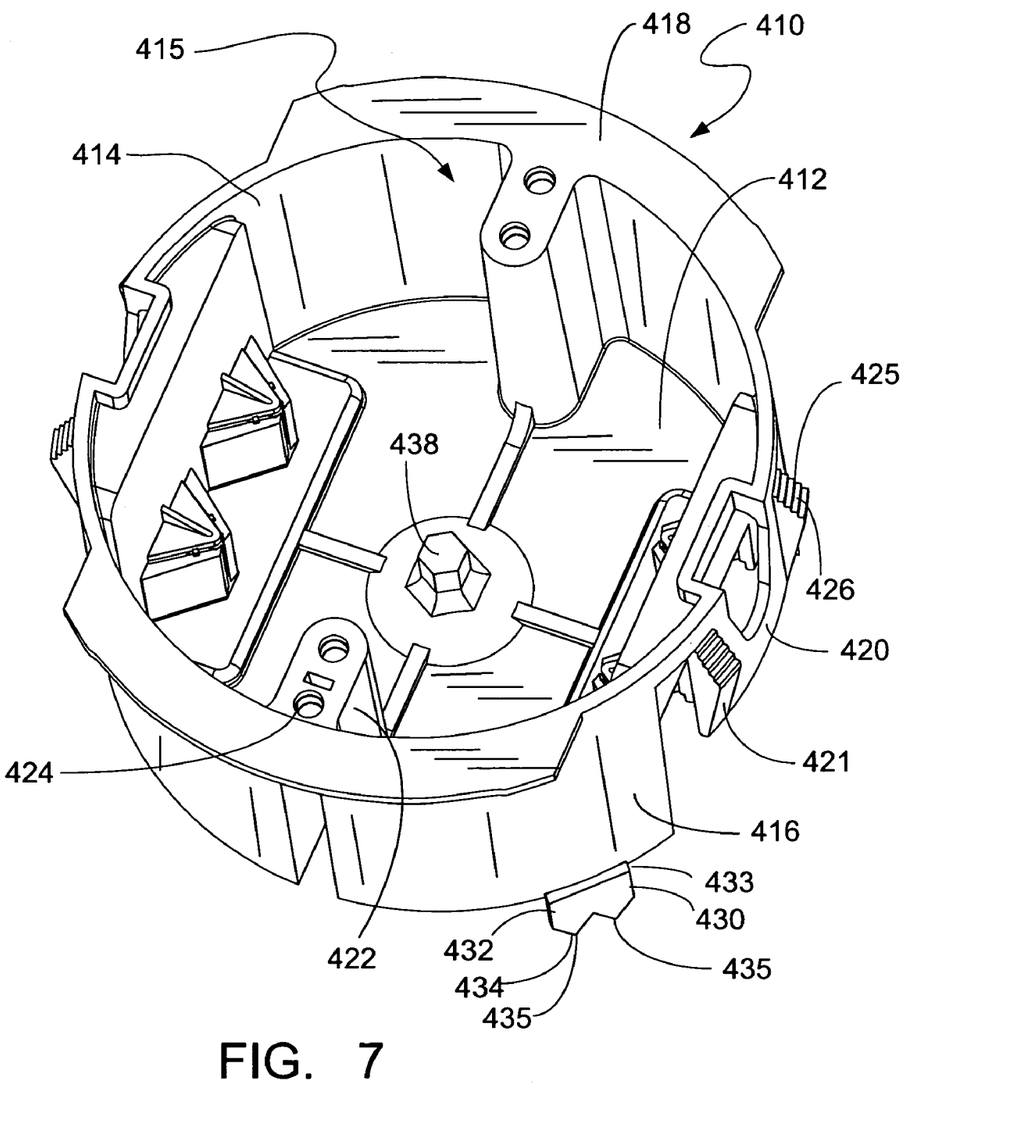
FIGS. 7 and 8 show respectively, front and rear perspective views of a fourth embodiment of the self cutting outlet box of the present invention.
Figure 8:
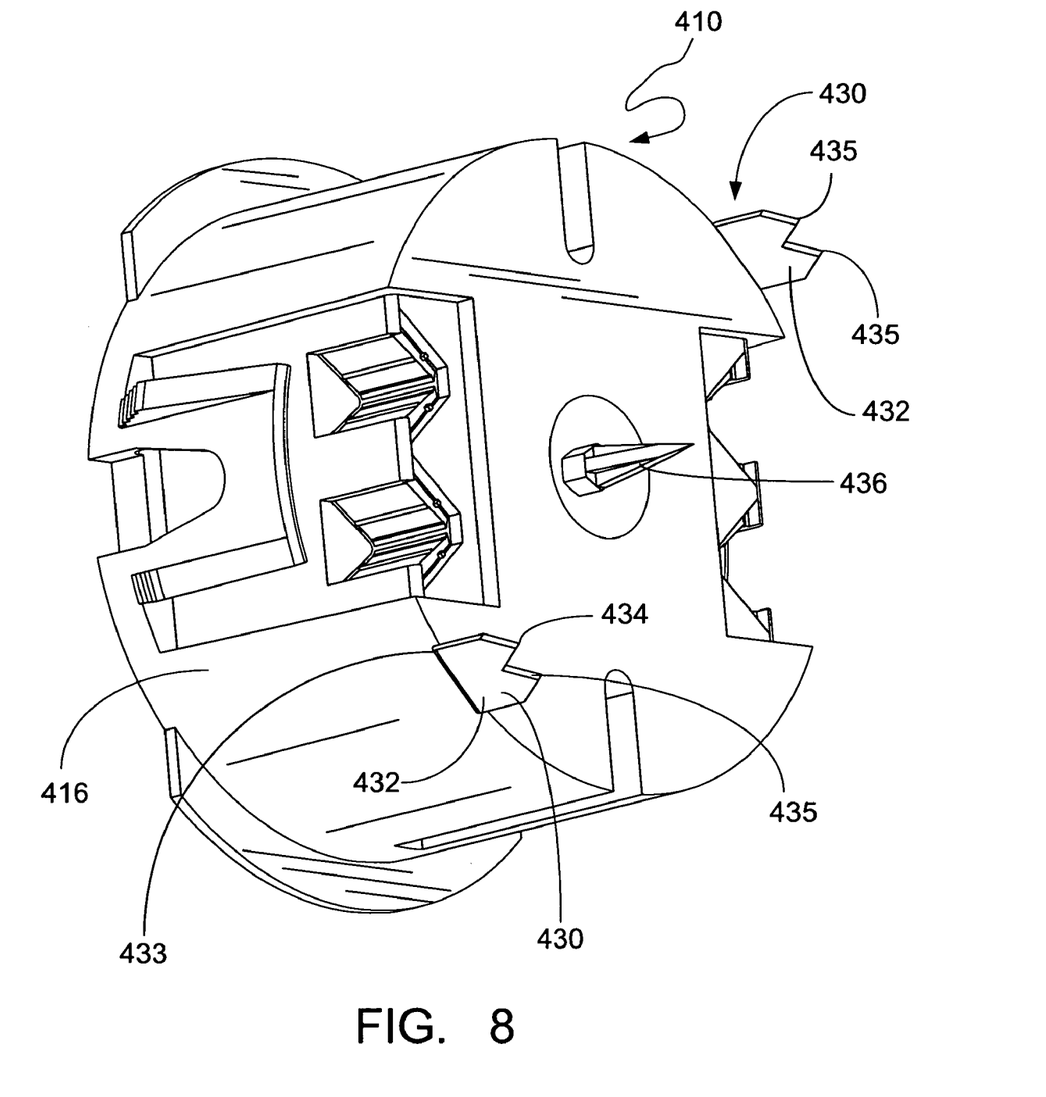

Referring now to FIGS. 7 and 8, the further embodiment of the present invention is shown. Box 410 is substantially similar to box 210 shown in FIGS. 5 and 6. However, rather than employing a separately formed and attached thereto cutting member 230 of box 210, box 410 includes one or more integrally formed cutting member 430.

Electrical outlet box 410 is of generally circular construction, having a flat-back wall 412 an opposed open-front face 414 and a generally cylindrical sidewall 416, extending perimetrically therebetween. The box 410 defines a box interior 415, which may support electrical devices such as switches and receptacles as is well known.

Box 410 may be formed of suitable plastic material well known in the art. While a plastic circular box is shown, the present invention is not limited thereto. Other materials and configurations may also be employed which provide the same strength and physical properties as plastic. For example, the box may be formed from other non-metallic and/or metallic compounds.

As is well known, box 410 is designed to be attached to a structural surface, such as wallboard, plywood or the like, through a hole placed therein. In that regard, the front face 414 of box 410 includes a pair of diametrically opposed outwardly extending flanges 418 which engage the outer surface of the wall through which the box is installed.

Box 410 further includes a pair of diametrically opposed mounting shoulders 422 positioned within interior 415 of the box 410. Shoulder 422 includes mounting apertures 424, which allow for securement of electrical devices such as switches and receptacles (not shown), as well as covers and face plates (also not shown). Box 410 also includes cable entry structure 24 which allows electrical cable to be passed into the interior 415 of box 410.

Boxes of the type commonly used within old work installation are typically attached to the wall through a pre-cut hole placed therein. The present invention provides a self-cutting box which places a hole in the wall upon installation. Box 410 in this embodiment includes a cutting member 430 formed adjacent back wall 412. Cutting member 430, in the embodiment shown in FIGS. 7 and 8, is provided by an integrally formed extension of sidewall 416. Cutting member 430 is an elongated member extending from the sidewall 416 or back wall 412. The length of the cutting member is defined as the length from the proximal edge 433 to the distal edge 434. The proximal edge 433 is the point of attachment of the cutting member 430 to the sidewall 416 and/or back wall 412. A distal edge 434 of extension 432 is serrated, providing a cutting edge 431 having one or more cutting extents capable of cutting through wallboard, plywood or the like. The cutting member 430 may be a separate piece attached at its proximal end 433 to the back wall 412 or sidewalls 416; or it may be an integral extension, i.e. molded or embedded to the sidewall 416 and/or back wall 412 at the proximal edges 433. The width of the cutting member 430 may be a narrow planar piece to include only one single serrated tooth 435 and not a row of teeth, or it may extend at least partially circumferentially around back wall 412 to include a row of teeth 435. The circular configuration of the box 410 allows the cutting edge 430 to be manipulated in a rotational manner to cut a circular opening through the wall. To facilitate such rotational movement, a center punch 436 extends outwardly from an extended surface of back wall 412 to provide a pilot hole about which rotation of the box may be achieved. Center punch 436 generally extends further from back wall 412 than do teeth 435.

Further, on the internal surface of back wall 412, a tool attachment hub 438 is provided. The tool attachment hub 438 allows attachment of a conventional power tool such as a drill, which will rotate the box to cut a hole through the wall.

Furthermore, box 410 includes a pair of deflectable mounting ears 420, which may be deflectably inserted into the opening in the wall upon formation thereof. Deflectable mounting ears 420 include a wedge portion which provides for tapered lead-in portion 421 and securement surface portion 425. The tapered lead-in portions 421 facilitate insertion of the mounting ears 420 into the opening formed in the wall. Mounting ears 420 also include a forwardly directed securement surface portion 425, having gripping teeth 426 thereon. Upon insertion of the box 410 into the opening in the wall, the mounting ears 420 are deflectable to permit insertion and the gripping teeth 426 engage the rear surface of the wall with the flanges 418, engaging the front surface of the wall. The box is secured between the mounting ears 420 and the flanges 418.

Turning now to FIGS. 9-12, installation of the self cutting outlet box 10 of the preferred embodiment as shown in FIGS. 1 and 2 may more fully be described.

Figures 9, 10:
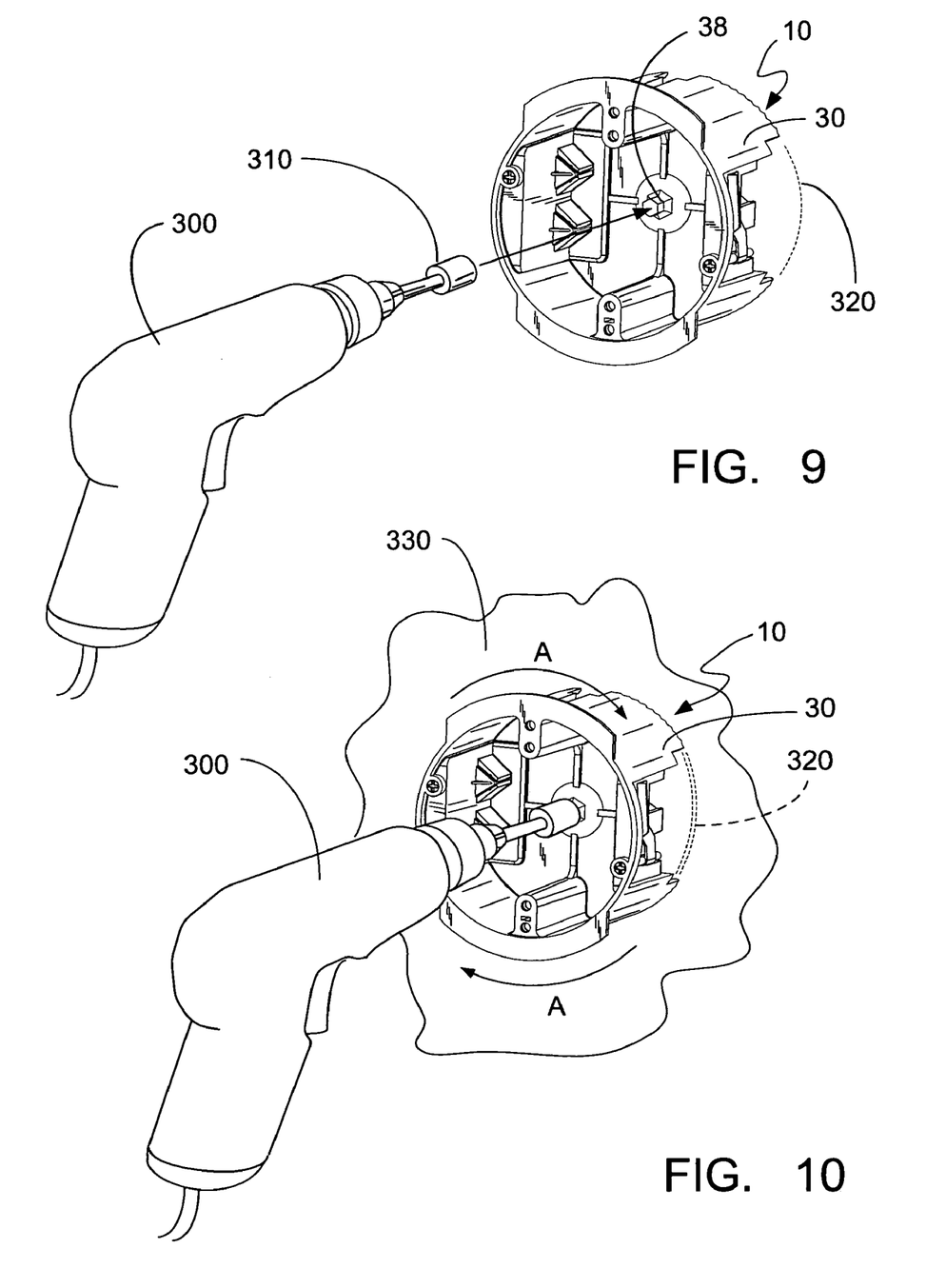
FIGS. 9 through 12 show typical installation steps involved in installing a self cutting outlet box of FIGS. 1 and 2.

The installer would use a typical driving tool such as an electric screwdriver or drill 300, having an appropriately selected attachable bit 310, which is designed to engage hub 38 of box 10.

Actuation of the tool 300 as shown in FIG. 10 causes rotation of box 10 in the rotational direction of arrows A. Such rotation causes the cutting member 30 to cut a circular hole 320 through wall 330. As the hole 320 is cut by the box 30 itself, it is sized to accommodate the box therein.

Figure 11:
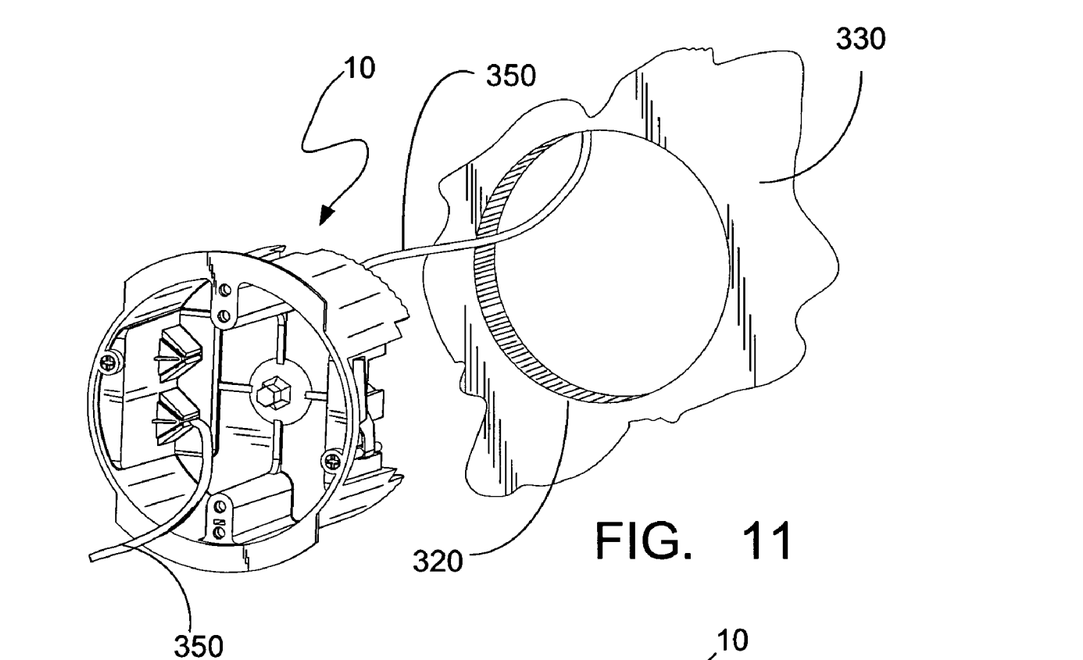
Figure 12:
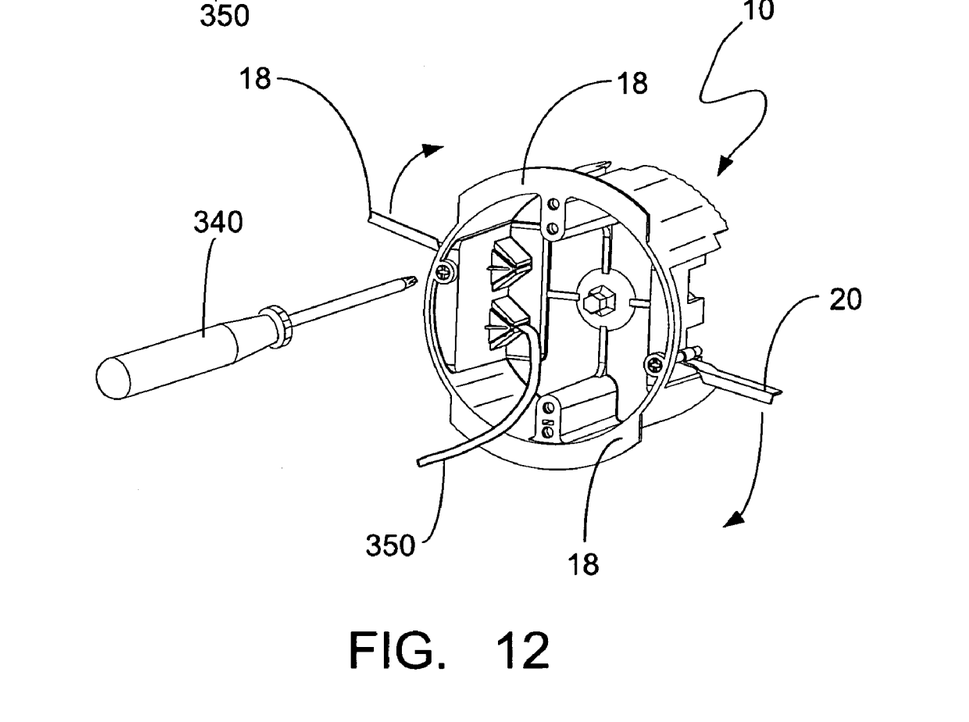

Turning now to FIG. 11, once the hole 320 is cut through wall 330, wires 350 run behind wall 330 may be placed in box 10 in conventional fashion. The box may then be inserted through the opening 320 in wall 330, whereupon the wings 20 may be used to secure the box to the wall between wings 20 and extending flanges 18, using a screwdriver 340 or the like.

What is claimed is:

1. A self cutting electrical outlet box assembly comprising:
    an electrical outlet box having an open front face, an opposed rear wall and a perimetrical side wall therebetween defining a box interior; and a cutting member includes a pair of cutting extents perpendicularly extending from said rear wall, each of said cutting extents having at least one tooth formed integrally with said cutting extents and extending exteriorly of said rear wall for cutting an opening in a wall surface;
    wherein said cutting member further includes an elongated member extending across the diameter of said rear wall between said pair of cutting extents.

2. The assembly of claim 1 wherein said cutting extents includes a row of teeth.

3. The assembly of claim 1 wherein said perimetrical wall is generally cylindrical.

4. The assembly of claim 3 wherein said box includes a central punch extending externally of said rear wall about which said box may be rotated.

5. The assembly of claim 1 wherein said rear wall in said box interior includes a tool engagement hub for accommodating a power tool attachment for rotating said box with respect to said wall surface.

6. The assembly of claim 1 wherein said at least one tooth includes a cutting edge that has been reinforced with a harder substance.

7. The assembly of claim 6 wherein said cutting member is overlaid with said harder substance.

8. A self cutting electrical outlet box assembly comprising:
    an electrical outlet box having an open front face, an opposed rear wall and a perimetrical side wall therebetween defining a box interior;
    a pair of deflectable mounting ears extending externally from said perimetrical side wall, said ears include lead-in geometry portion and forwardly directed securement surface portion having gripping teeth to secure the box to a wall; and
    a cutting member having at least one tooth formed integrally with said perimetrical side wall and extending exteriorly of said rear wall for cutting an opening in a wall surface.

* * * * *